United States Patent
Kim et al.

(10) Patent No.: US 9,628,364 B2
(45) Date of Patent: Apr. 18, 2017

(54) TEST AUTOMATION SYSTEM AND METHOD FOR DETECTING CHANGE IN SIGNATURE OF INTERNET APPLICATION TRAFFIC PROTOCOL

(71) Applicant: SOMANSA CO., LTD., Seoul (KR)

(72) Inventors: Tae Wan Kim, Seoul (KR); Seung Tae Paek, Seoul (KR); Sang Man Lee, Daejeon (KR)

(73) Assignee: SOMANSA CO., LTD., Seoul (KR)

( * ) Notice: Subject to any disclaimer, the term of this patent is extended or adjusted under 35 U.S.C. 154(b) by 205 days.

(21) Appl. No.: 14/699,581

(22) Filed: Apr. 29, 2015

(65) Prior Publication Data

US 2016/0308749 A1   Oct. 20, 2016

(30) Foreign Application Priority Data

Apr. 17, 2015 (KR) .................. 10-2015-0054411

(51) Int. Cl.
*G06F 15/173* (2006.01)
*H04L 12/26* (2006.01)

(52) U.S. Cl.
CPC .............. *H04L 43/14* (2013.01); *H04L 43/50* (2013.01)

(58) Field of Classification Search
USPC ....... 709/203, 217, 219, 223, 224, 226, 228, 709/230, 232; 726/7
See application file for complete search history.

(56) References Cited

U.S. PATENT DOCUMENTS

| | | | |
|---|---|---|---|
| 9,258,313 B1* | 2/2016 | Knappe | H04L 63/12 |
| 2011/0145902 A1* | 6/2011 | Kim | H04N 21/23436 |
| | | | 726/7 |
| 2012/0173702 A1* | 7/2012 | Szabo | H04L 43/026 |
| | | | 709/224 |

FOREIGN PATENT DOCUMENTS

| | | |
|---|---|---|
| KR | 20130054511 A | 5/2013 |
| KR | 20140060821 A | 5/2014 |

* cited by examiner

*Primary Examiner* — Quang N Nguyen
(74) *Attorney, Agent, or Firm* — Miles & Stockbridge P.C.

(57) ABSTRACT

A method of detecting a change in a signature of Internet application traffic of an Internet application traffic protocol generated between a server and a client in a test automation system includes the steps of executing a test script to operate an application of the client, receiving an actual analysis result of analyzing the signature of the Internet application traffic generated according to the operation of the application from a protocol analysis device, comparing the actual analysis result with a predictive analysis result, and detecting whether there is a change in the signature from a comparison result of comparing the actual analysis result with the predictive analysis result.

10 Claims, 2 Drawing Sheets

TEST AUTOMATION SYSTEM AND METHOD FOR DETECTING CHANGE IN SIGNATURE OF INTERNET APPLICATION TRAFFIC PROTOCOL

CROSS-REFERENCE TO RELATED APPLICATION

This application claims priority to and the benefit of Korean Patent Application No. 10-2015-0054411, filed on Apr. 17, 2015, the disclosure of which is incorporated herein by reference in its entirety.

BACKGROUND

1. Field of the Invention

The present invention relates to a test automation method and system for detecting a change in a signature of an Internet application traffic protocol, and more particularly, to a test automation method and system for automatically detecting a change in a signature of an Internet application traffic protocol so as to verify accuracy for an analysis result of a protocol analysis device.

2. Discussion of Related Art

A determination of whether there is a change in a protocol is limited because conventional protocol analysis devices analyze the protocol based on simple information such as an Internet protocol (IP) address or a port number.

In order to determine whether there is a change in the protocol, a tester directly iteratively executes an Internet application of a client and verifies whether there is a change in the protocol in which the Internet application is used. In this case, there is a problem in that much manpower and work time may be necessary.

Accordingly, there is a need for an approach capable of automatically detecting whether there are changes in protocols of a large number of Internet applications.

SUMMARY OF THE INVENTION

An object of the present invention is to provide a method and system for detecting a change in a signature of an Internet application traffic protocol that may automatically detect whether there is a change in a protocol of an Internet application.

According to one aspect of the present invention for achieving the aforementioned object, a method of detecting a change in a signature of Internet application traffic of an Internet application traffic protocol generated between a server and a client in a test automation system includes the steps of: executing a test script to operate an application of the client; receiving an actual analysis result of analyzing the signature of the Internet application traffic generated according to the operation of the application from a protocol analysis device; comparing the actual analysis result with a predictive analysis result; and detecting whether there is a change in the signature from a comparison result of comparing the actual analysis result with the predictive analysis result.

According to another aspect of the present invention for achieving the aforementioned object, a test automation system for detecting a change in a signature of Internet application traffic of an Internet application traffic protocol generated between a server and a client includes: a test automation agent configured to execute a test script to operate an application of the client; and a test automation server configured to receive an actual analysis result of analyzing the signature of the Internet application traffic generated according to the operation of the application from a protocol analysis device, compare the actual analysis result with a predictive analysis result, and detect whether there is a change in the signature from a comparison result of comparing the actual analysis result with the predictive analysis result.

According to the present invention, it is possible to reduce manpower and cost for maintenance and update management of a protocol analysis device for analyzing an Internet application traffic protocol by automating detection on a change in a signature of the Internet application traffic protocol.

In addition, it is possible to rapidly update an analysis result in the protocol analysis device by finding a change in a protocol in early stage. Consequently, it is possible to improve reliability of the protocol analysis device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
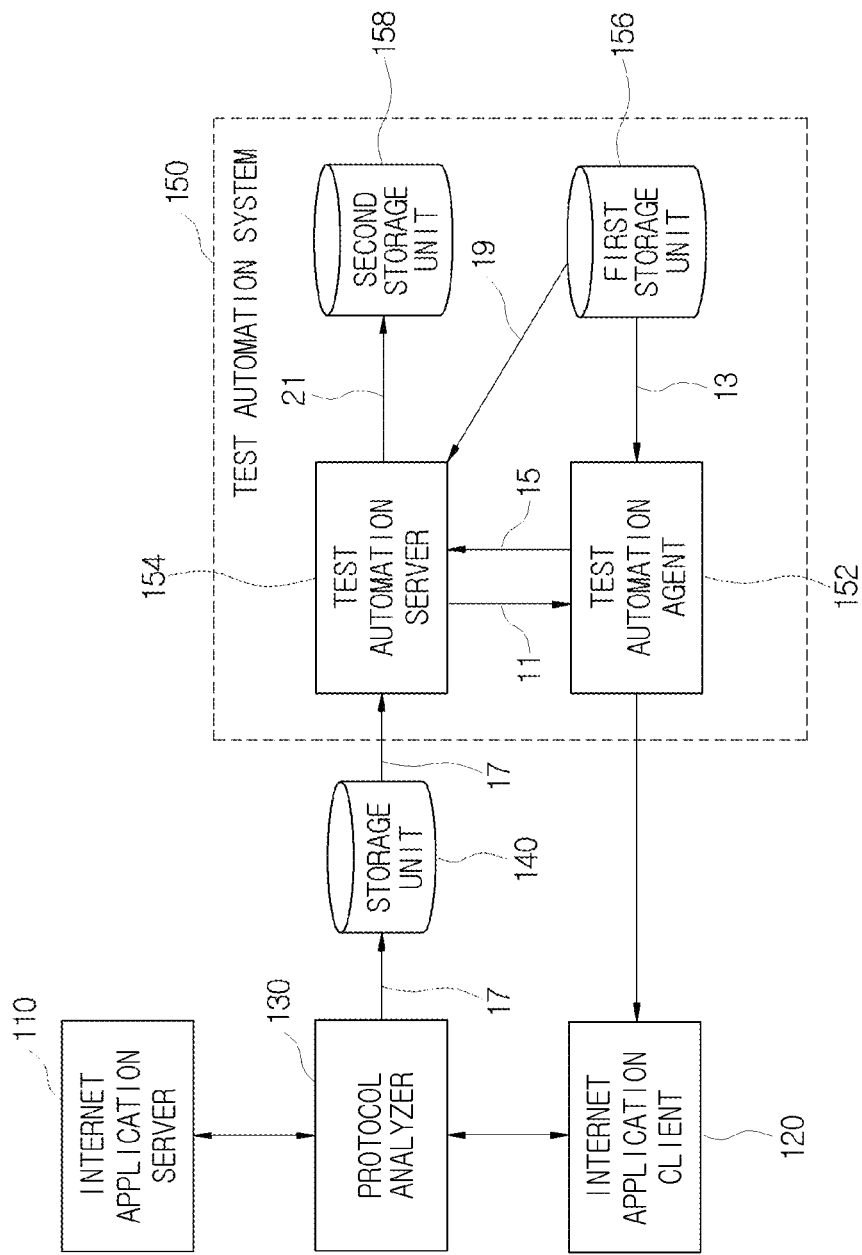
FIG. 1 is a block diagram schematically illustrating the entire configuration of a test automation system for detecting a change in a signature of an Internet application traffic protocol according to an exemplary embodiment of the present invention.

The present invention is not limited to the exemplary embodiments to be disclosed below, but may be implemented in various different forms. The embodiments are provided merely to make those having ordinary knowledge in the field of art to which the present invention pertains easily understand the objects, configurations, and effects of the present invention. The present invention will be defined only by the scope of the claims.

The terminology used herein to describe embodiments of the invention is not intended to limit the scope of the invention. In the present specification, unless particularly described in the description, a singular form includes a plural form. The term "comprises," "comprising," "includes," and/or "including," when used herein, specify the presence of components, steps, operations, and/or elements, but do not preclude the presence or addition of one or more other components, steps, operations, and/or elements.

Hereinafter, for the better understanding of the present invention, several technical terms used herein will be introduced.

Internet Application

The Internet application (hereinafter may be referred to as an application) includes examples of a webpage, a webmail, a messenger, and the like as an application program for performing a processing procedure of generating a transmission/reception event (or Internet application traffic) of a data packet in an environment of a server and a client.

In the case of the webpage, webpage access, webpage login, webpage inquiry, creation, and transmission, and the like may be data packet transmission/reception events.

In the case of the messenger, messenger login, dialogue transmission and reception, file transmission and reception, and the like may be data packet transmission/reception events.

Signature

The signature is defined as a unique pattern within a header or payload constituting a data packet for classifying (checking or identifying) a corresponding application from application traffic.

The signature pattern may be an arrangement of bytes having a sequence in the packet payload within a flow of a corresponding application program.

The signature pattern may be divided in various types as follows.

Type in which one common string appears in a fixed offset of a data packet.

Type in which one common string appears in a variable offset of a data packet.

Sequence of one or more strings in the fixed offset of the data packet

Sequence of two or more common strings in the variable offset of the data packet This signature type may be extracted from various signature extraction algorithms. There is a longest common subsequence (LCS) algorithm as an example of the signature extraction algorithm. This algorithm may be installed within a protocol analyzer 130 illustrated in FIG. 1.

The signature may be analyzed based on the data packet or a stream of the entire flow.

A method of analyzing the signature based on the stream of the flow requires a process of recombining all data packets for classifying (checking or identifying) an application in the form of a stream. Thus, an additional processing process and a storage space are necessary. In addition, when the flow stream is not completely recombined due to loss of a data packet or the like, the classification (check or identification) of the application may be impossible.

Accordingly, in the present invention, the signature is analyzed based on the data packet in consideration of accuracy of the classification (check or identification) of the application and the load of the system (the protocol analyzer of FIG. 1).

Test Case

The test case is defined as a set including a plurality of test scripts.

Test Script

The test script may be a program or a command set in which a processing procedure of executing and operating an application is created in a computer programming language to generate a transmission/reception event of a data packet. At this time, the computer programming language may be a script language.

The execution of the test script is interpreted to have the same meaning as the execution of the application. According to this interpretation, the execution of the test script means the generation of application traffic, that is, the generation of a data packet, in an environment of a server and a client. In addition, the execution of the test script is interpreted to have the same meaning as an operation of a graphical user interface (GUI) to be provided in the application.

FIG. 1 is a block diagram schematically illustrating the entire configuration of a test automation system for detecting a change in a signature of an Internet application traffic protocol according to an exemplary embodiment of the present invention.

Referring to FIG. 1, the test automation system 150 for detecting the change in the signature of the Internet application traffic protocol according to the exemplary embodiment of the present invention automatically detects the change in the signature of the application traffic protocol generated between an Internet application server (hereinafter referred to as an "application server") 110 and an Internet application client (hereinafter referred to as an "application client") 120 connected to an Internet network (not illustrated). Here, the application client 120 may be implemented in any one of hardware, software, and a combination thereof. When the application client 120 is implemented in software, the application client 120 may be included in a test automation agent 152. At this time, the application client 120 may be interpreted as the term "application" itself. When the application client 120 is included inside the test automation agent 152, a universal processor within the test automation agent 152 becomes an entity for executing an application of the application client 120.

The test automation system 150 includes the test automation agent 152, a test automation server 154, a first storage unit 156, and a second storage unit 158.

The test automation agent 152 may be a computing apparatus including a central processing unit (CPU), a memory, and a system bus for connecting the CPU and the memory.

The test automation agent 152 receives an execution command 11 for executing the test script from the test automation server 154 and receives a test case 13 corresponding to the execution command 11 from the first storage unit 156.

The test automation agent 152 executes a plurality of test scripts included in the test case 13 received from the first storage unit 156.

The application client 120 executes an application to generate a data packet according to execution of a plurality of test scripts, transmits the generated data packet to the application server 110, and receives another data packet related to the data packet from the application server 110. The transmitted/received data packet forms application traffic between the application client 120 and the application server 110.

Meanwhile, the protocol analyzer 130 captures a data packet transmitted and received between the application client 120 and the application server 110 and analyzes the captured data packet to extract a signature.

The protocol analyzer 130 analyzes the extracted signature for each item. An analysis result (hereinafter referred to as an actual analysis result) is stored in a storage unit 140. Here, the item includes an item related to webpage access, an item related to webpage login, an item related to webmail inquiry, an item related to webmail creation, an item related to webmail transmission and reception, an item related to messenger login, an item related to dialogue transmission and reception in a messenger, an item related to file transmission and reception in the messenger, and the like.

When the execution of the test script is completed, the test automation agent 152 provides an execution completion message 15 indicating execution completion of the test script to the test automation server 154.

The test automation server 154 receiving the execution completion message 15 starts an operation of detecting a change in a signature of Internet application traffic generated between the application server 110 and the application client 120.

Specifically, when the execution completion message 15 is received from the test automation agent 152, the test automation server 154 receives an actual analysis result 17 of analyzing the signature for each item from the storage unit 140 through an inquiry. At this time, the test automation server 154 also receives a predictive analysis result 19 stored in the first storage unit 156.

Here, the predictive analysis result 19 means an analysis result capable of being predicted (expected or desired) by a developer or tester from each item of a predictive signature in a state in which there is no change in the signature of the application traffic generated between the application server 110 and the application client 120 according to execution of the test case 13.

The test automation server 154 compares the actual analysis result 17 of the signature received from the protocol analyzer 130 through the storage unit 140 with the predictive analysis result 19 of the predictive signature received from the first storage unit 156 for each item.

The test automation server 154 determines that the analysis has succeeded when the actual analysis result 17 and the predictive analysis result 19 are the same as each other through the comparison for each item, and determines that the analysis has failed when the actual analysis result 17 and the predictive analysis result 19 are different from each other.

The test automation server 154 stores a determination result of success or failure as a detection result 21 of detecting whether there is a change in the signature of the Internet application traffic protocol in the second storage unit 158.

The test automation server 154 provides the developer or tester with the detection result 21 through an output apparatus (not illustrated) configured to output a video or printed matter.

When the change in the signature of the Internet application traffic protocol is checked from the detection result provided from the output apparatus, the developer or tester performs a follow-up step of reanalyzing the Internet application traffic protocol and updating the analysis result in the protocol analyzer to the reanalysis result or the like.

Figure 2:
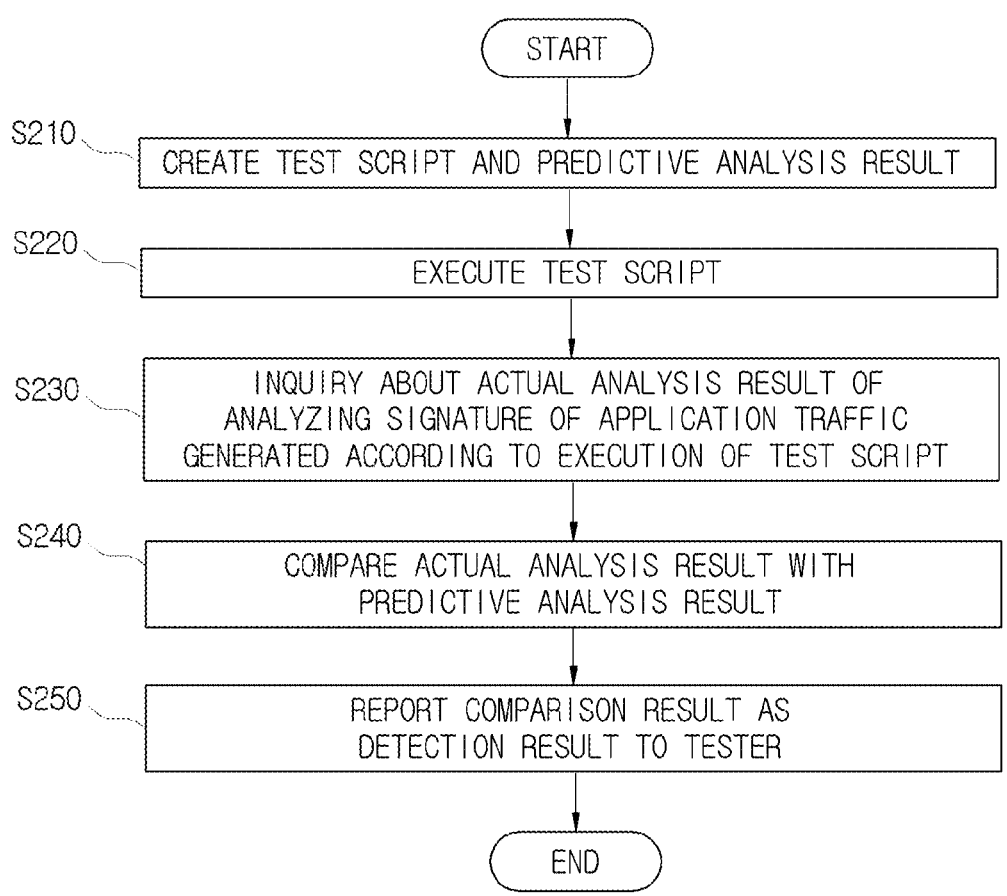
FIG. 2 is a flowchart illustrating a test automation method of detecting a change in a signature of an Internet application traffic protocol according to an exemplary embodiment of the present invention.

FIG. 2 is a flowchart illustrating a processing procedure of detecting whether there is a change in a signature of an Internet application traffic protocol in the test automation system illustrated in FIG. 1. For the better understanding, description will be given with reference to FIG. 2 along with FIG. 1.

Referring to FIG. 2, first, an application of the application client 120 is executed, and the test case 13 and the predictive analysis result 19 for an operation are created (or generated) (S210).

Here, the predictive analysis result means a predicted (expected or desired) analysis result when the developer or tester analyzes each item of a predictive signature when there is no change in a signature of application traffic generated between the application server 110 and the application client 120 according to execution of the test case 13.

The test case 13 and the predictive analysis result 19 may be created (generated) in the test automation agent 152 or the test automation server 154 according to a user input. The created test case 13 and the created predictive analysis result 19 may be mapped with each other and stored in the first storage unit 156.

Subsequently, the test automation agent 152 executes a test script of the test case 13 according to an execution command of the test automation server 154 (S220). When the test script is executed, application traffic (or data packet transmission/reception) is generated between the application client 120 and the application server 110.

Subsequently, the test automation server 154 inquires about the actual analysis result 17 of analyzing the signature generated according to the execution of the test script in the protocol analyzer 130 (S230).

Subsequently, the test automation server 154 compares the actual analysis result 17 with the predictive analysis result 19 for each item of the signature (S240). The test automation server 154 determines that the analysis has succeeded when the actual analysis result 17 and the predictive analysis result 19 are the same as each other through the comparison for each item, determines that the analysis has failed when the actual analysis result 17 and the predictive analysis result 19 are different from each other, and generates the determination result as a detection result.

Subsequently, the generated detection result is reported to the tester or developer (S250). For example, the detection result may be converted into output data of a video or printed document form and the output data may be transmitted to a computer of the tester or developer via a wired or wireless communication network.

When the change in the signature of the Internet application traffic protocol is checked from the reported detection result, the developer or tester performs a follow-up step of reanalyzing the Internet application traffic protocol and updating the analysis result of the previously analyzed Internet application traffic protocol to a reanalysis result or the like.

As described above, according to the present invention, it is possible to reduce manpower and cost for maintenance and update management of a protocol analysis device for analyzing an Internet application traffic protocol by automating detection on a change in a signature of the Internet application traffic protocol. In addition, rapid protocol analysis and update are enabled by finding whether there is a change in a protocol in early stage and therefore it is possible to improve reliability of the protocol analysis device.

The present invention is not limited to the configurations and methods of the above-described embodiments, and all or some of the embodiments may be selectively combined and configured so that the embodiments may be modified in various ways.

What is claimed is:

1. A method of detecting a change in a signature of Internet application traffic of an Internet application traffic protocol generated between a server and a client in a test automation system, the method comprising the steps of:
   executing a test script to operate an application of the client;
   receiving an actual analysis result of analyzing the signature of the Internet application traffic generated according to the operation of the application from a protocol analysis device;
   comparing the actual analysis result with a predictive analysis result; and
   detecting whether there is a change in the signature from a comparison result of comparing the actual analysis result with the predictive analysis result;
   wherein the step of comparing the actual analysis result with the predictive analysis result includes comparing the actual analysis result with the predictive analysis result of analyzing a predictive signature of the Internet application traffic predicted in a state in which there is no change in the signature, and further includes comparing the signature with the predictive signature for each item, wherein the item includes webpage access, webpage login, webmail inquiry, webmail creation, webmail transmission and reception, messenger login, dialogue transmission and reception in a messenger, and file transmission and reception in the messenger.

2. The method according to claim 1, further comprising the steps of:
   creating the test script and the predictive analysis result in advance; and
   storing the test script and the predictive analysis result created in advance in a storage means within the test automation system.

3. The method according to claim 1, wherein the step of operating the application of the client includes the steps of:
   operating a graphical user interface (GUI) of the application according to the execution of the test script; and
   generating a data packet transmitted from the client to the server according to the operation of the GUI to generate the Internet application traffic.

4. A test automation system for detecting a change in a signature of Internet application traffic of an Internet application traffic protocol generated between a server and a client, the test automation system comprising:
   a processor coupled to a memory;
   a test automation agent configured to execute a test script to operate an application of the client; and
   a test automation server configured to receive an actual analysis result of analyzing the signature of the Internet application traffic generated according to the operation of the application from a protocol analysis device, compare the actual analysis result with a predictive analysis result, and detect whether there is a change in the signature from a comparison result of comparing the actual analysis result with the predictive analysis result;
   wherein the test automation server compares the actual analysis result with the predictive analysis result of analyzing a predictive signature of the Internet application traffic predicted in a state in which there is no change in the signature, and further compares the signature with the predictive signature for each item, and wherein the item includes webpage access, webpage login, webmail inquiry, webmail creation, webmail transmission and reception, messenger login, dialogue transmission and reception in a messenger, and file transmission and reception in the messenger.

5. The test automation system according to claim 4, wherein the test automation agent executes the test script in response to an execution command of the test automation server.

6. The test automation system according to claim 4, wherein the test automation agent operates a GUI of the application according to the execution of the test script and generates a data packet transmitted from the client to the server according to the operation of the GUI to generate the Internet application traffic.

7. The test automation system according to claim 4, wherein the test automation agent provides the test automation server with an execution completion message indicating execution completion of the test script when the execution of the test script is completed.

8. The test automation system according to claim 7, wherein the test automation server starts a detection operation of detecting whether there is a change in the signature in response to the execution completion message.

9. The test automation system according to claim 7, wherein the test automation server inquires about the signature of the Internet application traffic analyzed by the protocol analysis device in response to the execution completion message and receives the signature of the Internet application traffic of the inquiry from the protocol analysis device.

10. The test automation system according to claim 4, further comprising:
   a storage unit configured to store the test script and the predictive analysis result in advance.

\* \* \* \* \*